United States Patent [19]

Moran et al.

[11] Patent Number: 4,513,017

[45] Date of Patent: Apr. 23, 1985

[54] PROCESS FOR PRODUCING A SPREAD STARTING FROM A BIMODAL DISPERSED PHASE

[75] Inventors: David P. J. Moran, Covington; David G. Sharp, Putnoe, both of England

[73] Assignee: Lever Brothers Company, New York, N.Y.

[21] Appl. No.: 431,985

[22] Filed: Sep. 30, 1982

[30] Foreign Application Priority Data

Oct. 7, 1981 [GB] United Kingdom ............... 3130324

[51] Int. Cl.³ ............................................. A23D 5/02
[52] U.S. Cl. .................................... 426/603; 426/604; 426/613
[58] Field of Search ............... 426/602, 603, 604, 583, 426/613, 654

[56] References Cited

U.S. PATENT DOCUMENTS

| | | | |
|---|---|---|---|
| 2,575,874 | 11/1951 | Herlow | 426/602 |
| 2,787,550 | 4/1957 | Struble et al. | 426/602 |
| 3,490,919 | 1/1970 | Moran | 426/604 X |
| 3,729,325 | 4/1973 | Howard | 426/602 |
| 3,892,039 | 9/1976 | Scibelli et al. | 426/603 |
| 3,892,873 | 7/1975 | Kolen et al. | 426/613 X |
| 4,366,180 | 12/1982 | Altrock et al. | 426/602 |

*Primary Examiner*—Robert Yoncoskie
*Attorney, Agent, or Firm*—Milton L. Honig; James J. Farrell

[57] ABSTRACT

There is disclosed a process for producing an oil-in-water-in-oil emulsion, which comprises:

(i) producing a bimodal oil-in-water emulsion by (a) preparing a cream comprising water, a stabilizing protein and oil in which the average diameter of the oil droplets ranges from 0.1 to 2 μm; (b) adding to the cream thus obtained an appropriate amount of oil and applying shear conditions such as to ensure that oil droplets are formed having an average diameter of at least 20 μm;

(ii) converting said bimodal emulsion into an oil-in-water-in-oil emulsion by applying conditions causing coalescence and crystallization of the larger oil droplets.

16 Claims, No Drawings

PROCESS FOR PRODUCING A SPREAD STARTING FROM A BIMODAL DISPERSED PHASE

The present invention relates to a process for producing an oil-in-water-in-oil (O/W/O) emulsion, particularly an O/W/O emulsion of the low-fat type.

By low-fat emulsion is understood an emulsion containing from 20 to 60% and preferably from 30 to 50% of fat. An O/W/O emulsion is an emulsion in which the continuous phase is an oil or fat (these terms are meant to be interchangeable) and the dispersed phase comprises a natural or an artificial cream.

The main object of the present invention is to produce an O/W/O emulsion which on consumption gives a creamy sensation and a good flavour impact on the palate.

It is another object of the present invention to produce a spread which is stable and retains its double emulsion character during storage.

Applicants have found a process which meets the longfelt need for this type of products.

The process according to the invention comprises:
(i) producing a bimodal oil-in-water emulsion by
 (a) preparing a cream comprising water, a stabilizing protein and oil in which the average diameter of the oil droplets ranges from 0.1 to 2 µm;
 (b) adding to the cream thus obtained an appropriate amount of oil and applying shear conditions such as to ensure that oil droplets are formed having an average diameter of at least 20 µm;
(ii) converting said bimodal emulsion into an oil-in-water-in-oil emulsion by applying conditions causing coalescence and crystallization of the larger oil droplets.

By a bimodal O/W emulsion is understood a water-continuous emulsion comprising dispersed fat droplets of significantly different average droplet size ranges. Emulsions of the O/W/O type have been described in e.g. Dutch patent application No. 6503860. Such emulsions are produced starting from a "mono-modal" cream, i.e. a cream comprising one type of droplets having an average diameter within the range of 0.5–1.0 micron.

During the production of spreads on an industrial scale a proportion of the final product is recirculated through the system. This involves a pasteurizing rework cycle carried out e.g. in the case of a breakdown of the packaging machine. Very often about 10% of the output is constantly reworked.

The use of a bimodal cream ensures that the small fat drops remain dispersed in the cream, whereas the larger drops coalesce and invert to the intended fat-continuous phase.

This remains the position even though a pasteurizing rework cycle converts the whole product into a water-continuous emulsion.

A conventional mono-modal cream would under similar circumstances either remain a cream or totally invert to a single W/O sytem if the oil drops were large enough. The droplets having an average diameter of up to 2 µm are obtained for instance by high pressure homogenisation at e.g. 250 kg/cm², whereas the larger droplets having an average diameter of at least 20 µm up to 150 µm or even larger than 150 µm are obtained by a low-shear regime, e.g. by gently mixing the cream and the added oil or fat, preferably in a vessel which is rotated at relatively low speed and ideally in a so-called Votator C-unit which comprises pins on the wall and is rotated at 200–400 rpm.

A very convenient way of performing step (b) consists in melting the fat to be added, adding to the molten fat an appropriate amount of fat-soluble flavours and optionally emulsifiers, cooling the fat in a holding tank to a temperature ranging from 35° to 45° C., proportioning this fat and the cream (which was previously pasteurized and subsequently allowed to cool to 35°–45° C.) via a T-piece into a Votator C-unit, where further cooling to 20°–25° C. is allowed to take place.

Coalescence of the larger droplets and crystallization are allowed to take placeby cooling the bimodal emulsion preferably to a temperature ranging from 0°–14° C. in a surface-scraped heat-exchanger, ideally in a Votator A-unit, which comprises rows of blades and wherein fat crystals are scraped from the walls and are thoroughly mixed with the emulsion.

Complete phase inversion is allowed to take place by feeding the emulsion which has been cooled and worked in e.g. a Votator A-unit, into a second crystallizing unit, preferably a so-called C-unit, which is rotated at relatively high speed, e.g. 500–700 rpm.

Various fats and oils can be used in the continuous and dispersed phases. When a relatively high amount of fat is used in the dispersed phase, some leakage may occur; in that case it is preferred that the same oil should be used in both phases to prevent any leakage from affecting the properties of the final product. In some instances it is advantageous to use different fats in the dispersed and continuous phases, to provide a better control of textural properties. Thus, oils displaying a steep dilatation line, such as palm kernel oil, coconut oil or babassu oil, are preferably used to impart coolness to the product. When these fats are used as partially or wholly hydrogenated fats, they may achieve an enhanced creamy sensation on the palate.

The weight ratio of the oil used in step (a) to the oil used in step (b) ranges from 0.1 to 0.5 and preferably from 0.2 to 0.4. The more fat is present in the dispersed phase, the creamier the product is but the greater the risk is that some oil leakage from the dispersed phase into the continuous phase will occur. Preferably a cream is produced which contains less than 15% by weight and preferably from 5 to 10% by weight of oil, based on the total composition.

Useful stabilizing proteins may include skim milk protein, caseinate, soy protein or whey protein. Preferably whey protein is used, because of its low isoelectric point, allowing the preparation of an aqueous phase having a low pH (4–5), which is bacteriologically safe. Ideally, a whey protein is used which has been obtained by membrane filtration of whey, followed by heat-treatment carried out at a temperature preferably ranging from 80°–95° C. to achieve denaturation. When whey protein is used as the stabilizing protein, relatively low concentrations, ranging from 0.5 to 2 wt.%, based on the total composition, impart a good stability.

The cream may further contain viscosity-increasing agents or gelling agents such as gelatin, starch, carboxymethylcellulose, locust bean gum or mixtures thereof.

Preferably gelatin is used, because of its melting behaviour under conditions prevailing in the mouth, at a level of at least 1 wt.%. Applicants have found that higher levels of gelatin, preferably ranging from 2.5–5 wt.%, resulted in relatively big aqueous phase drops of about 30-40 μm, which promoted a sensation of creaminess of the product on the palate (see Tables A and B).

The invention will now be illustrated by the following Examples:

EXAMPLE 1

Preparation of a cream

Whey protein (1.66%) obtained by membrane filtration was dissolved in water (37 wt.%) at 60° C.

A fat blend (7.5 wt.%), containing flavour, was added to the protein solution and the mixture was subjected to high pressure homogenization at 250 kg/cm² to produce a cream in which the average size of the droplets was about 1 micron.

Gelatin (1.5 wt.%), dissolved in water (15 wt.%), was added to the cream. Further water was added to reach a level of 55.51 wt.%. The pH was adjusted to 4.7 using a 20% solution of lactic acid. The cream was pasteurized at 90° C. for 30 minutes to denature the whey protein and subsequently water-soluble flavours (0.1 wt.%) were added. In order to disperse possible clumps, the cream was re-homogenized at a pressure of 70 kg/cm².

32.18 wt.% of the same fat blend used for preparing the cream was melted and to the molten blend was added 0.5 wt.% of fat-soluble flavours and emulsifiers. The blend was subsequently cooled to 40° C. in a holding tank and was then proportioned with the cream (which had been allowed to cool to 40° C.) via a T-piece into a crystallizer Votator C-unit, where the emulsion was allowed to cool to 20°-25° C. while being rotated at 200 rpm.

A water-continuous bimodal emulsion, containing oil drops having a diameter ranging from 20-150 μm emerged from the C-unit and was processed through a Votator A-unit and a C-unit rotating at 700 rpm to achieve phase inversion and provide the final fat-continuous product.

EXAMPLES 2-4

The procedure of Example 1 was repeated, except that the level of gelatin was increased to the following concentrations: 2.5%, 5%. The Instron test values on the gel, the flavour impact scores and the creaminess scores are summarized in Tables A and B.

TABLE A

| *Gelatin on product % | Instron test values on gel | | | | Flavour Impact Score (1 = low - 9 = high) |
|---|---|---|---|---|---|
| | Yield point | Brittleness | Deformability | Thickness | |
| 1.5 | 15.5 | 2.3 | 9.0 | 51.6 | 4 |
| 2.5 | 31.6 | 11.2 | 10.7 | 71.6 | 6 |
| 5.0 | 140.0 | 34.0 | 12.7 | 260.0 | 7 |

*270 bloom strength

TABLE B

| Gelatin on product (%) | Average Drop Size of Aqueous Phase in Product (μm) | Creaminess Score (1 = low - 5 = high) |
|---|---|---|
| 1.5 | 10-12 | 2 |
| 2.5 | 15-20 | 2 |
| 5.0 | 30-40 | 3 |

We claim:

1. A process for producing an oil-in-water-in-oil emulsion, which comprises:
   (i) producing a bimodal oil-in-water emulsion by
      (a) preparing a cream comprising water, a stabilizing protein and oil in which the average diameter of the oil droplets ranges from 0.1 to 2 micrometers;
      (b) adding to the cream thus obtained an amount of oil sufficient to cause the resulting mixture to comprise oil in the amount of 20 to 60 wt.% and applying an effective amount of shearing sufficient to ensure that oil droplets from the added oil are formed having an average diameter of at least 20 micrometers;
   (ii) converting said bimodal emulsion into an oil-in-water-in-oil emulsion by applying conditions causing coalescence and crystallization of the larger oil droplets.

2. A process according to claim 1, in which in step (a) the smaller oil droplets are produced by applying high pressure homogenization.

3. A process according to claim 1, in which in step (b) the larger oil droplets are produced by mixing the cream and the added oil at a low speed.

4. A process according to claim 1, in which step (ii) is carried out by working and cooling the bimodal emulsion in a surface-scraped heat-exchanger at a temperature ranging from 0° to 14° C.

5. A process according to claim 1, in which complete conversion of the bimodal emulsion in step (ii) is achieved by first subjecting said bimodal emulsion to working and cooling in a surface-scraped heat-exchanger at a temperature ranging from 0° to 14° C. and subsequently working the emulsion in a second crystallizing unit at high speed.

6. A process according to claim 1, in which the oil used in step (a) is the same as the oil used in step (b).

7. A process according to claim 1, in which the weight ratio of the oil used in step (a) to the oil used in step (b) ranges from 0.1 to 0.5.

8. A process according to claim 7, in which the weight ratio of the oil used in step (a) to the oil used in step (b) ranges from 0.2 to 0.4.

9. A process according to claim 1, in which in step (a) a cream is produced which contains less than 15% by weight of oil, based on the total composition.

10. A process according to claim 9, in which a cream is produced which contains from 5 to 10 wt.% of oil, based on the total composition.

11. A process according to claim 1, in which a stabilizing protein comprises whey protein.

12. A process according to claim 11, in which the whey protein has been obtained by membrane filtration of whey.

13. A process according to claim 11 wherein, the whey protein is heat denatured.

14. A process according to claim 11, in which from 0.5 to 2% by weight of whey protein is used.

15. A process according to claim 1, in which the cream further comprises at least 1 wt.% of gelatin, based on the total composition.

16. A process according to claim 1, in which from 2.5 to 5 wt.% of gelatin is used, based on the total composition.

* * * * *